United States Patent Office 3,545,280
Patented Dec. 8, 1970

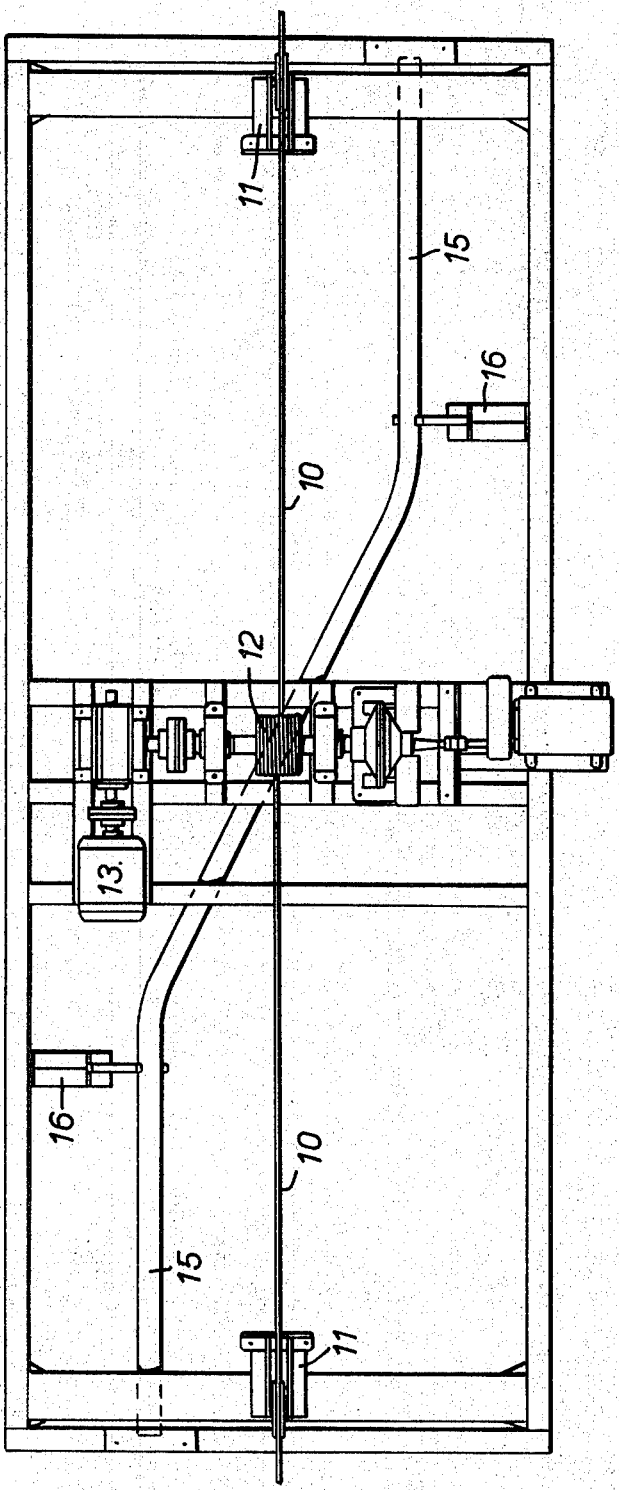

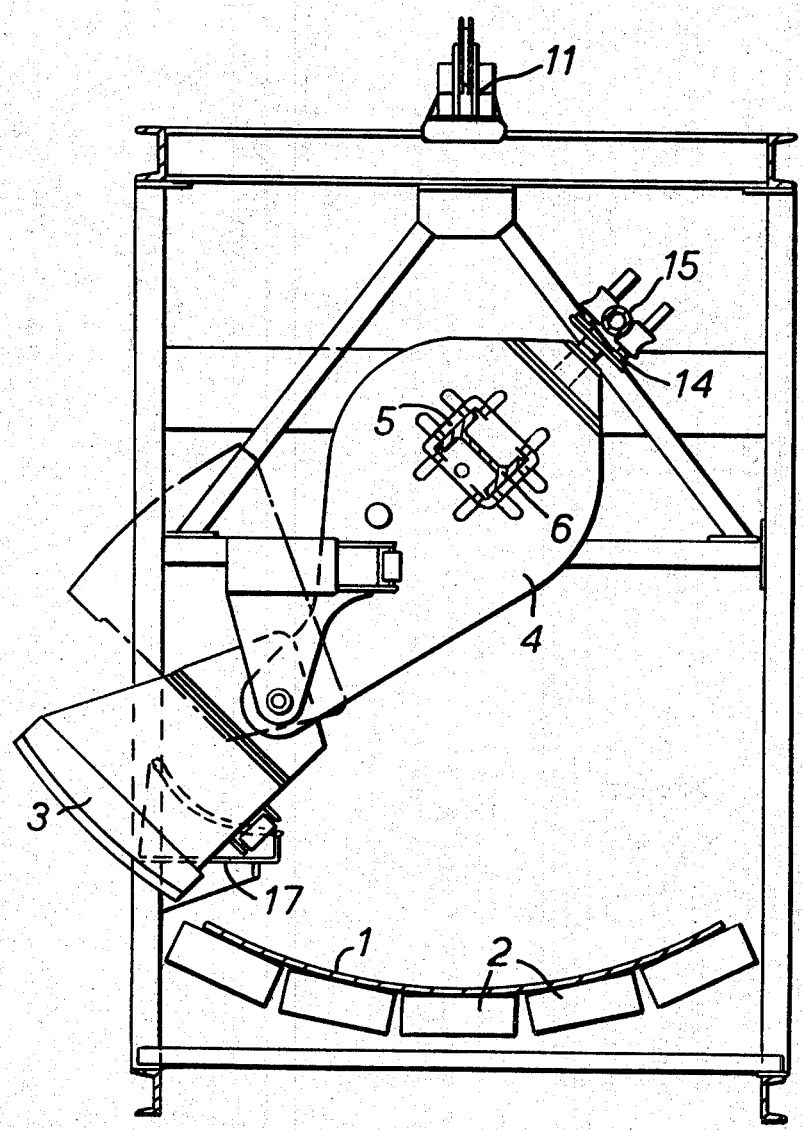

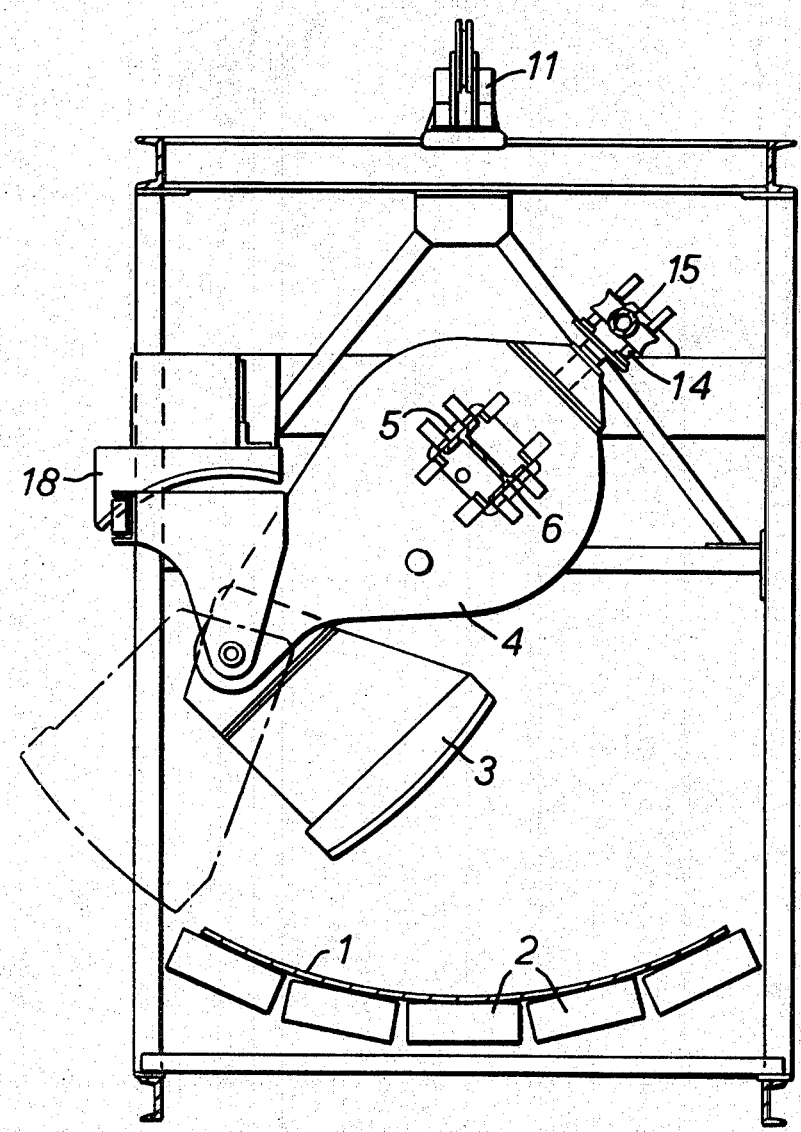

3,545,280
SAMPLING DEVICES FOR BULK MATERIALS
Warner Barry Gosney, Chesterfield, England, assignor to The Birmingham Small Arms Company Limited, Birmingham, England, a British company
Filed Nov. 18, 1968, Ser. No. 776,485
Int. Cl. G01n *1/02*
U.S. Cl. 73—423                                                7 Claims

ABSTRACT OF THE DISCLOSURE

A device adapted for taking a sample from bulk material on a moving conveyor belt has a sample collecting bucket mounted on one end of an arm which is rotatable about the axis of, and movable longitudinally along, a beam disposed above and in longitudinal alignment with the belt. The bucket is held to one side of the belt while the arm is accelerated from rest to a speed equal to that of the belt, swings across the belt and collects a transverse sample therefrom while moving at the same speed as the belt, and is held to the other side of the belt while the arm is decelerated back to rest.

---

This invention relates to sampling devices for bulk materials and is concerned with the sampling of material being carried by a moving belt conveyor.

In order to obtain good samples it is desirable that the increments should be as true a cross section of the mass of material on the belt as is practicable and should be taken substantially at right angles to the run of the belt, due allowance being made for the relative motion between the collector and the belt. An example of an invention in this field is described in our prior patent specification No. 931,901.

According to the present invention a device adapted for use in taking a sample from bulk material on a moving conveyor belt comprises a cutter or collector (hereinafter called "the bucket") for cutting or collecting the sample, the bucket being mounted on an arm which is supported above the conveyor belt and adapted to be moved longitudinally substantially parallel to the longitudinal plane of the belt (with the bucket clear of the material on the belt) and also to be moved transversely across the belt (with the bucket in sample-taking engagement with the material on the belt) means being provided to bring up the speed of the longitudinal bucket movement to approximately that of the conveyor belt before the transverse movement is effected for collecting the sample.

The transverse movement of the arm (which may form one arm of a two-armed lever) desirably takes place whilst it is being moved longitudinally in order that the sample shall be taken as nearly as possible at right angles to the run of the belt.

The arm preferably moves radially about its support when effecting the transverse movement and the upper run of the conveyor belt is preferably disposed in a curvature approximating to the arc followed by the transverse travel of the bucket.

The invention will now be described with reference to the accompanying drawings, which are generally of diagrammatic form and in which:

FIG. 2 is a plan view of the device shown in FIG. 1,

FIG. 3 is a view of the device on the line A—A of FIG. 1, and

FIG. 4 is a view of the device on the line B—B of FIG. 1.

Figure 1:
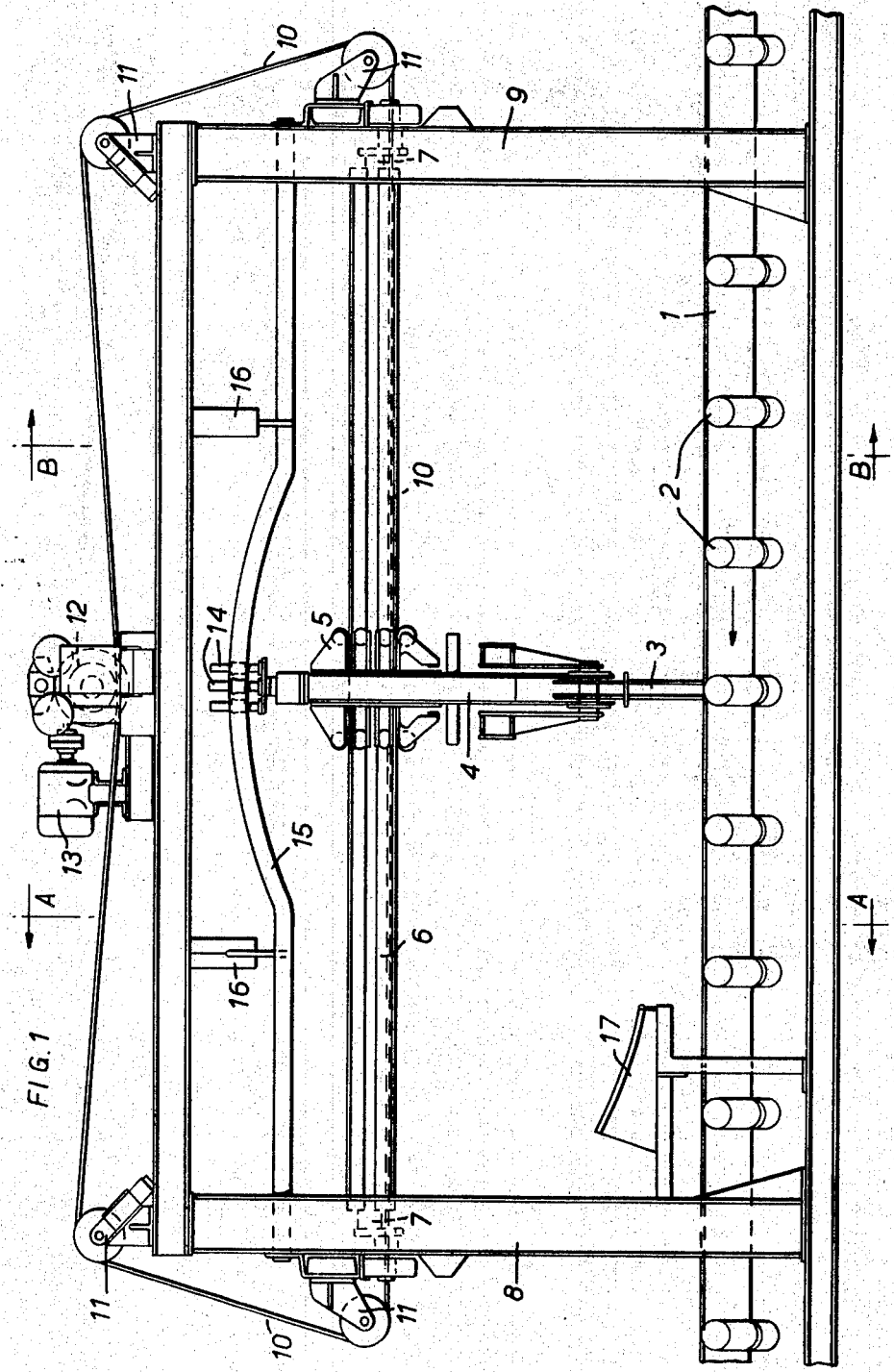
FIG. 1 is a side view of a preferred embodiment of the invention.

As shown in FIGS. 1, 3 and 4, the upper run of a conveyor belt 1 carrying the material to be sampled is formed with a cross sectional curvature by means of rollers 2. A sample-taking bucket 3 of substantially rectangular box formation with an open front end is pivotally mounted near one end of a two-armed lever 4 which is mounted on a carrier 5 for longitudinal movement on a support beam 6 disposed above and preferably in longitudinal alignment with the belt 1, the beam being rotatably mounted but longitudinally confined in trunnions 7 attached to frame members 8 and 9. The support beam is rotatable in order to give a radial movement to the lever and therefore to the bucket 3 in the manner hereafter described. The aforesaid longitudinal movement of the lever 4 along the support beam 6 is effected by a rope 10, preferably of wire, secured by swivelling eye bolts to each end of the carrier 5, the ropes passing over sheaves 11 secured to the frame members 8 and 9 on to a rope drum 12 driven by an electric motor 13 arranged to run at synchronous speed with a motor or motors (not shown) driving the conveyor belt 1.

At the other end of the lever 4, remote from the bucket mounting, there is provided a roller device 14 which is adapted to engage with a fixed cam track in the form of a rod 15 disposed above the support beam 6, the ends of the rod being secured to the frame members 8 and 9. As seen in FIG. 2, the outer portions of the rod 15 are parallel to but offset from the longitudinal axis of the conveyor belt 1 and beam 6, the intermediate portion of the rod being angularly disposed in parallel relation to the support beam 6. The rod 15 is supported adjacent to its angular portion by brackets 16 secured to further frame members of the device.

With the bucket 3 at its starting position at one end of the device, motion is imparted to the two-armed lever 4 which by means of the motor-driven rope 10 is caused to travel along the beam 6, this travel accelerating from rest up to the speed of the conveyor belt 1 with the bucket clear of the material on the belt, and which speed is reached when the roller device 14 on the lever 4 enters the angularly disposed portion of the cam rod 15. A radial movement is then imparted to the lever 4 and bucket 3 across the belt 1, with the bottom edge following the curvature of, and preferably being in light contact with, the surface of the belt. As soon as the bucket is clear of the conveyor belt, its movement is retarded before lineal travel of the lever 4 is reversed in direction to occupy its starting position.

In addition to the radial movement above described, the bucket 3 is moved about its pivot on the lever 4 by means of cooperating surfaces on it engaging with cams on fixed frame parts of the device. During such times as sample is not being taken, the bucket 3 is moved into an upper position by a lifting cam 17, as shown in FIG. 3, and when sample is being taken the bucket is moved into a lower position by a cam 18, as shown in FIG. 4. At the end of the radial cutting stroke movement of the bucket, the increment is discharged from the bucket, preferably into a suitable chute.

While the sampling device may be manually controlled, it is preferably operated automatically. For example the motion of the electric motor 13, which drives the carrier 5 of the two-armed lever 4 on which the bucket is mounted, may be initiated and controlled by a suitable timer mechanism through appropriate switches or other control gear.

What I claim is:

1. A device adapted for taking a sample from bulk material on a moving conveyor belt comprising a beam extending above and substantially longitudinally of said belt, an arm mounted for movement longitudinally along said beam and for rocking movement above the longitudinal axis of said beam, a sample collecting bucket mounted on said arm, means for moving said arm longitudinally along said beam, and means for holding said bucket at one side of the belt while accelerating said arm from an initial rest position to substantially the speed of said belt, swinging said bucket across the belt to collect a transverse sample therefrom while moving at substantially the same speed as said belt and then holding the bucket at the other side of said belt while decelerating said arm to stop movement along said beam.

2. A device as recited in claim 1, wherein said last named means comprises stationary means extending longitudinally of said beam for effecting controlled rocking of said arm for attaining said bucket movements.

3. A device according to claim 1 wherein said arm engages a guide which solely controls orientation of the arm about the axis of said beam as the arm is moved longitudinally along the beam.

4. A device according to claim 3 wherein said arm is mounted on the beam at a point intermediate its two ends with the bucket mounted on the lower end of said arm, and the end of the arm remote from the bucket is in engagement with said guide which comprises a fixed cam track disposed above the beam.

5. A device according to claim 4 wherein said cam track is in the form of a rod fixed in the device and adapted to be engaged by roller means mounted on the end of the arm remote from the bucket, said rod having end portions parallel to, but disposed on either side of, the longitudinal axis of the beam and an intermediate portion angularly disposed to the longitudinal axis of the beam.

6. A device according to claim 5 wherein longitudinal movement of the arm along the beam is effected by flexible cable means attached to either side of the arm, the cable means being motor driven in such a manner as to accelerate the arm from rest to a speed substantially equal to the speed of the belt as the arm reaches said angularly disposed intermediate portion of the cam rod and to maintain that speed until the arm has passed said portion, at which time said arm swings from one side to the other side of the belt and the bucket collects a transverse sample therefrom while moving at the same speed as the belt.

7. A device according to claim 1 wherein said bucket is pivotally connected to an end of the arm, a second stationary guide in the device being so disposed as to be engaged by the bucket and thereby pivot said bucket upwardly at the end of a forward sampling run in order that the arm can return along said beam to its initial position without the bucket engaging the material on the belt, and a third stationary guide in said device being so disposed as to be engaged by the bucket and thereby pivot it downwardly at the end of the return run in readiness for the next sampling run.

References Cited

UNITED STATES PATENTS

| 3,181,369 | 5/1965 | Taylor | 73—423 X |
| 3,280,635 | 10/1966 | Cochet | 73—424 |

FOREIGN PATENTS

| 817,930 | 8/1959 | Great Britain | 73—421 |

S. CLEMENT SWISHER, Primary Examiner

U.S. Cl. X.R.

73—324